(12) United States Patent
Van Vleck et al.

(10) Patent No.: US 9,342,517 B2
(45) Date of Patent: May 17, 2016

(54) PARAMETRIC ANALYSIS OF MEDIA METADATA

(75) Inventors: Paul Van Vleck, Austin, TX (US); Lee Begeja, Gillette, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 672 days.

(21) Appl. No.: 13/299,723

(22) Filed: Nov. 18, 2011

(65) Prior Publication Data

US 2012/0066343 A1    Mar. 15, 2012

Related U.S. Application Data

(63) Continuation of application No. 12/272,947, filed on Nov. 18, 2008, now Pat. No. 8,086,611.

(51) Int. Cl.
  *G06F 17/30* (2006.01)

(52) U.S. Cl.
  CPC ...... *G06F 17/30038* (2013.01); *G06F 17/3089* (2013.01)

(58) Field of Classification Search
  CPC .................. G06F 17/30038; G06F 17/3089
  USPC ........................................................ 707/748
  See application file for complete search history.

(56) References Cited

U.S. PATENT DOCUMENTS

| | | | |
|---|---|---|---|
| 5,848,418 A | 12/1998 | de Souza et al. | |
| 6,044,375 A | 3/2000 | Shmueli et al. | |
| 6,324,553 B1 | 11/2001 | Cragun et al. | |
| 6,564,263 B1 * | 5/2003 | Bergman et al. | 709/231 |
| 6,873,740 B1 | 3/2005 | Devillers et al. | |
| 7,043,438 B2 | 5/2006 | Murakami | |
| 7,082,429 B2 | 7/2006 | Lin et al. | |
| 7,162,489 B2 | 1/2007 | Folting et al. | |
| 7,197,158 B2 | 3/2007 | Camara et al. | |
| 7,240,053 B2 | 7/2007 | Svendsen et al. | |
| 7,433,876 B2 * | 10/2008 | Spivack .............. G06F 17/3089 | |
| 7,761,399 B2 * | 7/2010 | Evans ................. G06F 17/3089 706/55 | |
| 8,086,611 B2 | 12/2011 | Van Vleck et al. | |
| 2003/0009495 A1 | 1/2003 | Adjaoute | |
| 2003/0135553 A1 * | 7/2003 | Pendakur ..................... 709/205 | |
| 2003/0195891 A1 | 10/2003 | Marsh | |

(Continued)

OTHER PUBLICATIONS

Shao, X. et al., "Automatic Summarization of Music Videos," ACM Transactions on Multimedia Computing, Communications and Applications, May 2006, vol. 2, No. 2, ACM, New York, New York, pp. 127-148.

(Continued)

*Primary Examiner* — Alex Gofman
*Assistant Examiner* — Merilyn Nguyen
(74) *Attorney, Agent, or Firm* — Toler Law Group, PC

(57) ABSTRACT

A method is disclosed that includes receiving, from a device of a user, a request to transmit a multimedia file. The method also includes automatically generating a generated content descriptor based on an analysis of the multimedia file using at least one analysis parameter. The method includes determining whether the generated content descriptor satisfies filter criteria of a profile associated with the user. The method further includes rejecting the request to transmit the multimedia file when the generated content descriptor does not satisfy the filter criteria of the profile. The method includes transmitting the multimedia file along with the generated content descriptor when the generated content descriptor satisfies the filter criteria of the profile.

20 Claims, 7 Drawing Sheets

(56) References Cited

U.S. PATENT DOCUMENTS

| | | |
|---|---|---|
| 2004/0130546 A1 | 7/2004 | Porikli |
| 2005/0086705 A1 | 4/2005 | Jarman et al. |
| 2005/0118557 A1* | 6/2005 | Sumner et al. ............... 434/118 |
| 2008/0212947 A1 | 9/2008 | Nesvadba et al. |
| 2008/0244636 A1* | 10/2008 | Card .............................. 725/25 |
| 2008/0300702 A1 | 12/2008 | Gomez et al. |
| 2009/0254499 A1* | 10/2009 | Deyo ............................. 706/12 |

OTHER PUBLICATIONS

Chen, X. et al., "Interactive Mining and Semantic Retrieval of Videos," MDM '07 Proceedings of the 8th international workshop on Multimedia data mining: (associated with the ACM SIGKDD 2007), Aug. 12, 2007, Article No. 8, Association for Computing Machinery, New York, New York, 9 pages.

* cited by examiner

PARAMETRIC ANALYSIS OF MEDIA METADATA

PRIORITY CLAIM

This application is a continuation patent application of, and claims priority from, U.S. patent application Ser. No. 12/272,947, filed on Nov. 18, 2008 and entitled "PARAMETRIC ANALYSIS OF MEDIA METADATA," which is hereby incorporated by reference in its entirety.

FIELD OF THE DISCLOSURE

The present disclosure is generally related to parametric analysis of media metadata.

BACKGROUND

A user requesting a multimedia file may not be able to determine the nature of the content included in the multimedia file. Certain types of content may be inappropriate for certain users. For example, videos that include violent scenes may be inappropriate for children. Further, certain multimedia files may be associated with file descriptions (e.g., metadata) provided by the publisher of the multimedia file. However, the descriptions provided by the publisher may be inaccurate or misleading.

DETAILED DESCRIPTION

Figure 1:
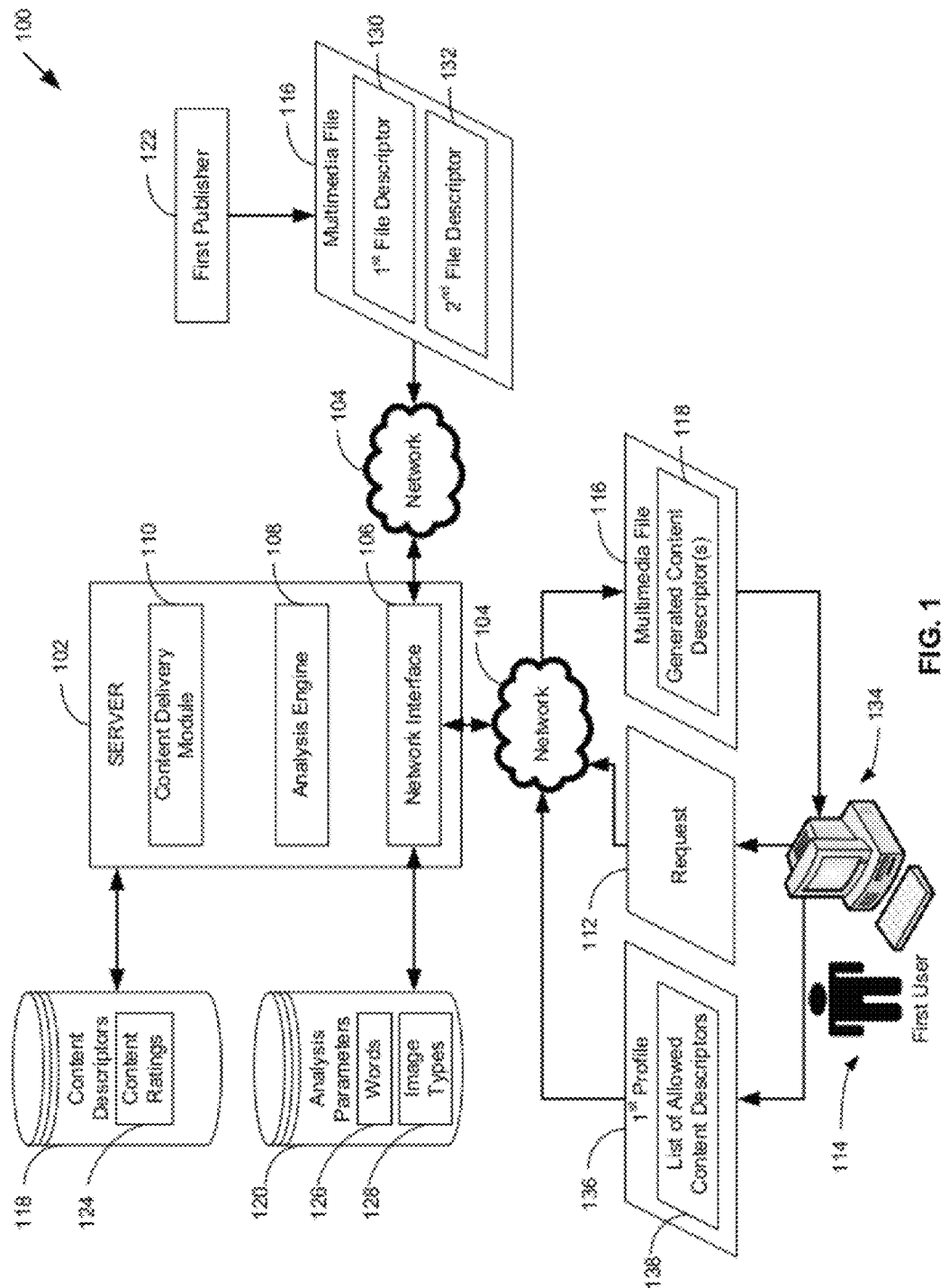
FIG. 1 is a block diagram of a first particular embodiment of a system to transmit a multimedia file along with at least one generated content descriptor.

In a particular embodiment, a method includes receiving a request to transmit a first multimedia file. The first multimedia file is associated with a first file descriptor. The method includes automatically generating a first generated content descriptor by analyzing the first multimedia file using a first set of analysis parameters. The method also includes comparing the first generated content descriptor to the first file descriptor and determining a first score based on a deviation of the first generated content descriptor from the first file descriptor.

In another particular embodiment, a computer-readable medium is disclosed. The computer-readable medium includes operational instructions, that when executed by a processor, cause the processor to generate a first generated content descriptor by analyzing a first multimedia file using a first set of analysis parameters. The first multimedia file is associated with a first file descriptor. The instructions further cause the processor to compare the first generated content descriptor to the first file descriptor and to determine a first score based on a first deviation of the first generated content descriptor from the first file descriptor. The instructions further cause the processor to generate a second generated content descriptor by analyzing a second multimedia file using a second set of analysis parameters. The second multimedia file is associated with a second file descriptor. The instructions further cause the processor to compare the second generated content descriptor to the second file descriptor and to determine a second score based on a second deviation of the second generated content descriptor from the second file descriptor. The instructions further cause the processor to combine the first score and the second score to determine a first reputation rating of a publisher.

In another particular embodiment, a system is disclosed that includes a network interface, an analysis engine and a content delivery module. The network interface is adapted to receive a request from a first user to transmit a multimedia file. The analysis engine is adapted to automatically generate a content descriptor based on an analysis of the multimedia file using at least one analysis parameter. The content delivery module is adapted to transmit the multimedia file along with the generated content descriptor.

The present disclosure is related to the analysis of multimedia files to determine descriptions of the content of the multimedia files. For example, a particular multimedia file available from a publisher over a network (e.g., a digital video file from an Internet site) may not include an accurate description of the type of content included in the multimedia file. For example, the publisher may provide a description of the multimedia file (e.g., metadata) that is inaccurate or misleading. A user that requests the multimedia file may rely on the description provided by the publisher.

Alternatively, the publisher may provide no information about the nature of the content included in the multimedia file. In the case of multimedia files with no associated descriptions, the user may not have any information available to determine if the content is appropriate. In the case of streaming media, a user may not be able to determine the nature of the content without viewing the multimedia file. The multimedia file may be analyzed in order to automatically generate one or more content descriptors to transmit along with the requested multimedia file. Further, profiles may be used to allow a user to filter multimedia files based on particular content criteria. For example, a parent may use a profile to ensure that a requested multimedia file includes content that is appropriate for a child (e.g., content with a G rating or a PG rating). Further, a reputation of a particular publisher may be determined by comparing descriptions provided by the publisher to the automatically generated content descriptors.

Referring to FIG. 1, a block diagram of a particular illustrative embodiment of a system to transmit a multimedia file along with at least one generated content descriptor is illustrated, at 100. The system includes a server 102 to send and receive data via a network 104 (e.g., an internet protocol network). The network 104 may include a wired network or a wireless network, or a combination thereof. For example, the network 104 may include a cellular network, a Wireless Fidelity (WiFi) network; an optical network; a Global System for Mobile (GSM) network; a Code Division Multiple Access (CDMA) network; a CDMA 2000 network; a Long Term Evolution (LTE) network; a Third Generation (3G) network; a Fourth Generation (4G) network; or a Worldwide Operability for Microwave Access (WiMAX) system, among other alternatives. The server 102 includes a network interface 106, an analysis engine 108, and a content delivery module 110. The network interface 106 is adapted to receive a request 112 from a first user 114 to transmit a multimedia file 116. For example, the multimedia file 116 may include audio, video, pictures, text, any other type of data, or any combination thereof. The analysis engine 108 is adapted to automatically generate one or more content descriptors 118 based on an analysis of the multimedia file 116 using one or more analysis parameters 120. In the embodiment illustrated in FIG. 1, the analysis parameters 120 are stored in a database that is accessible to the server 102 (e.g., via the network interface 106). Alternatively, the analysis parameters 120 may be stored locally at the server 102. The content delivery module 110 is adapted to transmit the multimedia file 116 along with at least one of the one or more generated content descriptors 118 to a destination device.

In operation, the first user 114 transmits the request 112 to receive the multimedia file 116 to the server 102. The request 112 is received at the network interface 106 of the server 102. In the embodiment illustrated in FIG. 1, the multimedia file 116 is published by a first publisher 122. In response to receiving the request 112, the server 102 retrieves the multimedia file 116 from the first publisher 122 via the network 104. Alternatively, the multimedia file 116 may be stored locally at the server 102. The analysis engine 108 analyzes the multimedia file 116 using one or more analysis parameters 120. Based on the analysis, the analysis engine 108 automatically generates one or more content descriptors 118. In a particular embodiment, the one or more generated content descriptors 118 include one or more content ratings 124. For example, the one or more content ratings 124 may include a G rating, a PG rating, a PG-13 rating, an R rating or an NC-17 rating. As another example, the one or more content ratings 124 may include a TV-Y rating, a TV-Y7 rating, a TV-Y7-FV rating, a TV-G rating, a TV-PG rating, a TV-14 rating, or a TV-MA rating. Further, the one or more content descriptors 118 may be generated and stored before the request 112 is received from the first user 114.

In a particular embodiment, the analysis parameters 120 include one or more words 126 associated with a particular content rating. For example, certain words (e.g., profanity) may be associated with an R rating or an NC-17 rating (e.g., adult content), while other words may be associated with G, PG or PG-13 ratings (e.g., child and teenage content). Further, the lack of certain words (e.g., profanity) may indicate that the content is suitable for children or teenagers. Alternatively, a lack of words may indicate that the multimedia file 116 includes pornographic material. As another example, the analysis parameters 120 may include one or more image types 128 associated with a particular content rating. For example, nude images may be associated with an R rating or an NC-17 rating (e.g., adult content). Similarly, the lack of nude images may indicate that the multimedia file 116 does not include adult content.

Various combinations of words 126 and image types 128 (among other alternative analysis parameters 120) may be used by the analysis engine 108 to automatically generate the one or more content descriptors 118. The analysis engine 108 may use various algorithms to determine whether the multimedia file 116 includes particular words 126 or image types 128. For example, the analysis engine 108 may include an image analyzer to classify images included in the multimedia file 116. As an example, the image analyzer may determine based on a chrominance/luminance analysis that the multimedia file 116 includes a certain amount of flesh tones, possibly indicative of nude images. As another example, the analysis engine 108 may include an audio analyzer to determine if an audio portion of the multimedia file 116 includes particular words or phrases (e.g., profanity).

A requested multimedia file (e.g, the multimedia file 116) may be associated with one or more file descriptors provided by a publisher (e.g., the first publisher 122). The one or more file descriptors provided by the publisher may be included in the multimedia file or otherwise associated with the multimedia file. For example, in the embodiment illustrated in FIG. 1, the multimedia file 116 is associated with a first file descriptor 130 and a second file descriptor 132 provided by the first publisher 122. For example, the file descriptors (e.g., existing metadata) associated with the multimedia file 116 may include dates, times, or titles, among other alternatives. As an illustration, the first file descriptor 130 may include a title that indicates that the multimedia file 116 includes adult content (e.g., profanity in title, adult theme in title). Further, the second file descriptor 132 may include other information provided by the first publisher 122. In a particular embodiment, the analysis engine 108 is further adapted to extract one or more file descriptors included in the multimedia file 116 or otherwise associated with the multimedia file 116. For example, the analysis engine 108 may extract the first file descriptor 130 and the second file descriptor 132 from the multimedia file 116. The extracted file descriptors may be used in the analysis of the multimedia file 116. Thus, while the information provided by the first publisher 122 may be inaccurate or potentially misleading, it may also be accurate. Therefore, in particular embodiments, one or more of the file descriptors provided by the first publisher 122 may be included in the analysis of the multimedia file 116.

The content delivery module 110 transmits the multimedia file 116 along with at least one of the one or more generated content descriptors 118 via the network interface 106. The first user 114 receives the multimedia file 116 from the server 102 via the network 104. For example, the first user 114 may receive the multimedia file 116 including the generated content descriptors 118 using a computing device 134. For example, the computing device 134 may include a personal computer (PC) 134 or any other computing device capable of receiving the multimedia file 116 (e.g., a laptop, a set top box, a portable electronic device, a cell phone, a personal digital assistant (PDA), among other alternatives).

In the embodiment illustrated in FIG. 1, the first user 114 is associated with a first profile 136. For example, the first profile 136 may include a list of allowed content descriptors 138. Alternatively, the first profile 136 may include any other information provided by the first user 114. For example, as described below, reputation ratings may be used to filter content from publishers that have negative reputation ratings. For example, the first profile 136 may indicate that the first user 114 is only interested in multimedia files from publishers with positive reputation ratings. Thus, a profile may be used to filter multimedia files based on various types of information.

The first profile 136 of the first user 114 may be communicated to the server 102 via the network 104. For example, when the first user 114 makes the request 112 for the multimedia file 116, the first profile 136 (including the list of allowed content descriptors 138) may be communicated along with the request 112. Alternatively, the first profile 136 (including the list of allowed content descriptors 138) may be stored locally at the server 102. For example, the first user 114 may use a graphical user interface (e.g., a web interface) to provide profile information to the server 102.

The analysis engine 108 is further adapted to determine whether the one or more generated content descriptors 118 are included in the list of allowed content descriptors 138. For example, the first user 114 may be a child, and a parent may define the first profile 136 so that the child receives appropriate multimedia content using the first profile 136. In this case, the list of allowed content descriptors 138 associated with the first profile 136 may include content descriptors associated with a G content rating or a PG content rating. When the one or more generated content descriptors 118 are not included in the list of allowed content descriptors 138, the content delivery module 110 is further adapted to reject the request 112 from the first user 114 to transmit the multimedia file 116. For example, when the generated content descriptors 118 indicate that the multimedia file 116 includes adult content, the multimedia file 116 would not be transmitted to the first user 114. Thus, the system of FIG. 1 enables control over transmission of multimedia files.

Figure 2:
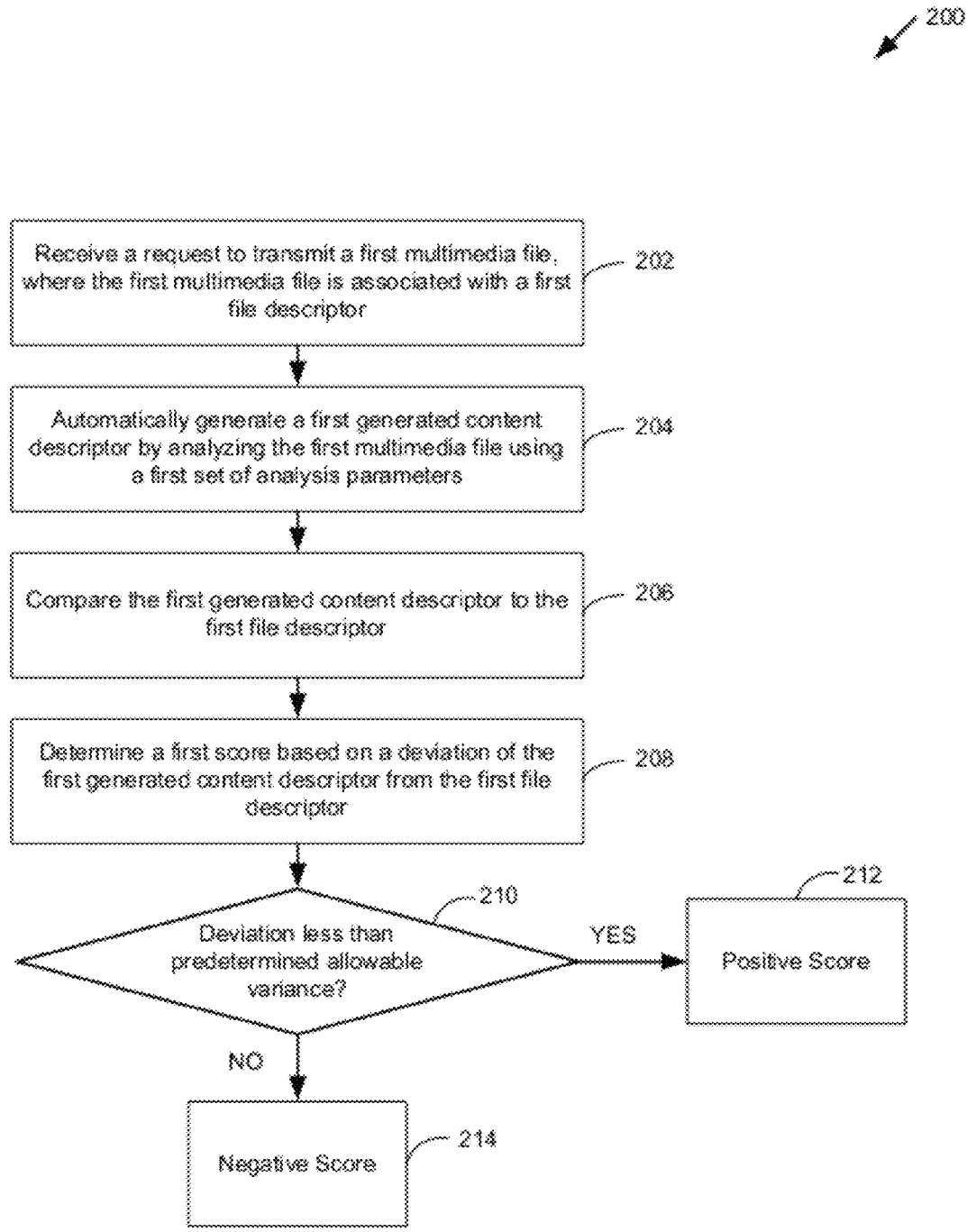
FIG. 2 is a flow chart of a first particular embodiment of a method of determining a score based on a comparison of a file descriptor to a generated content descriptor.

Referring to FIG. 2, a first particular embodiment of a method of determining a score based on a comparison of a file descriptor to a generated content descriptor is illustrated, at 200. The method includes receiving a request to transmit a first multimedia file, at 202. The first multimedia file is associated with a first file descriptor. The first file descriptor may be included in the first multimedia file or otherwise associated with the first multimedia file. For example, in FIG. 1, the server 102 receives the request 112 to transmit the multimedia file 116 published by the first publisher 122. The multimedia file 116 is associated with the first file descriptor 130. The method includes automatically generating a first generated content descriptor by analyzing the first multimedia file using a first set of analysis parameters, at 204. For example, in FIG. 1, the analysis engine 108 analyzes the multimedia file 116 and automatically generates a generated content descriptor 118 using one or more analysis parameters 120. The method includes comparing the first generated content descriptor to the first file descriptor, at 206. For example, in FIG. 1, the generated content descriptor 118 is compared to the first file descriptor 130.

The method includes determining a first score based on a deviation of the first generated content descriptor from the first file descriptor, at 208. The deviation represents a difference between file descriptors provided by the publisher and the automatically generated content descriptors. For example, in FIG. 1, the first file descriptor 130 of the multimedia file 116 may include a title that indicates a family theme (e.g., "family picnic video"). The generated content descriptor 118 may indicate that the multimedia file 116 includes content with an R rating. In this case, the first score would be a negative score, indicating that the information provided by the first publisher 122 was not reliable.

In the embodiment illustrated in FIG. 2, the method includes determining whether the deviation is less than a predetermined allowable variance, at 210. When the deviation is less than the predetermined allowable variance, the first score is a positive score, as shown at 212. When the deviation exceeds the predetermined allowable variance, the first score is a negative score, as shown at 214. The predetermined allowable variance represents an acceptable deviation of the generated content descriptor (e.g., the generated content descriptor 118 of FIG. 1) and the file descriptor provided by the publisher (e.g., the first file descriptor 130 of FIG. 1). For example, the first file descriptor 130 may include a title that indicates that the multimedia file 116 is related to water sports. Based on an analysis of the multimedia file 116 (e.g., using the analysis engine 108 of FIG. 1), it may be determined that only ten percent of the images included in the multimedia file 116 include water (e.g., using an image analyzer and colors associated with water images). A target percentage may be fifty percent of the images that include water. The acceptable deviation from the target percentage (e.g., the predetermined allowable variance) may be twenty percent. Therefore, a range between forty percent (ten percent less than target of fifty percent water images) and sixty percent (ten percent more than fifty percent water images) would be considered acceptable. In this case, the analysis of the multimedia file 116 determined that only ten percent of the images were water images, outside the acceptable range, resulting in a negative score.

Thus, a positive score 212 may indicate that a content source (e.g., the first publisher 122 of FIG. 1) provided an accurate description of the content of the requested multimedia file (e.g., the multimedia file 116 of FIG. 1). Similarly, a negative score 214 may indicate that the content source (e.g., the first publisher 122 of FIG. 1) did not provide an accurate description of the requested multimedia file. A reputation of a particular publisher may be determined based on scores for multiple published multimedia files. For example, multiple positive scores may result in a positive publisher reputation rating, while multiple negative scores may result in a negative publisher reputation rating.

Figure 3:
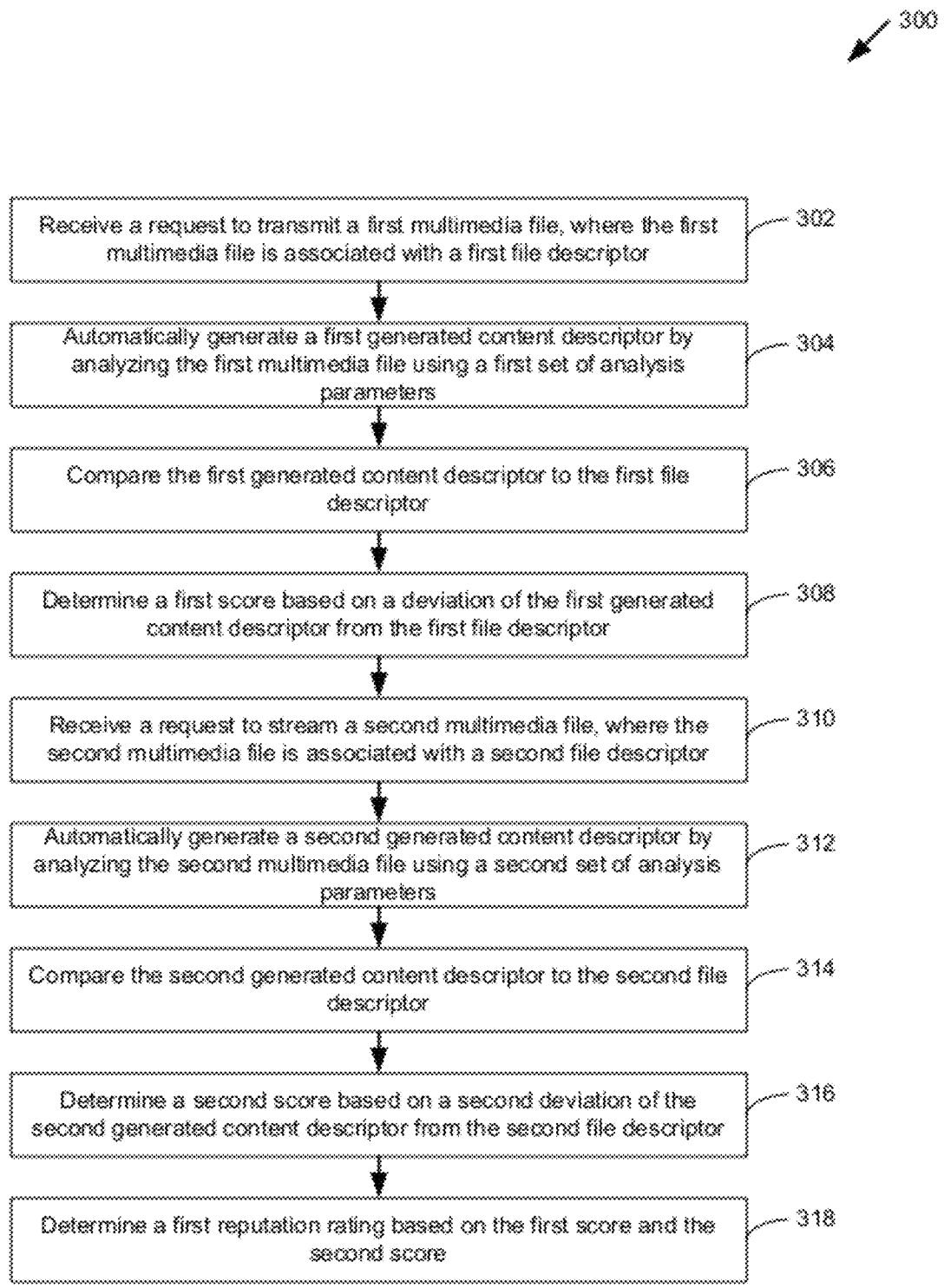
FIG. 3 is a flow chart of a second particular embodiment of a method of determining a score based on a comparison of a file descriptor to a generated content descriptor.

Referring to FIG. 3, a second particular embodiment of a method of determining a score based on a comparison of a file descriptor to a generated content descriptor is illustrated, at 300.

The method includes receiving a request to transmit a first multimedia file, at 302. The first multimedia file is associated with a first file descriptor. The first file descriptor may be included in the first multimedia file or otherwise associated with the first multimedia file. For example, in FIG. 1, the server 102 receives the request 112 to transmit the multimedia file 116 published by the first publisher 122. The multimedia file 116 includes the first file descriptor 130. The method includes automatically generating a first generated content descriptor by analyzing the first multimedia file using a first set of analysis parameters, at 304. For example, in FIG. 1, the analysis engine 108 analyzes the multimedia file 116 and automatically generates a generated content descriptor 118 using one or more analysis parameters 120. The method includes comparing the first generated content descriptor to the first file descriptor, at 306. For example, in FIG. 1, the generated content descriptor 118 is compared to the first file descriptor 130.

The method includes determining a first score based on a deviation of the first generated content descriptor from the first file descriptor, at 308. The deviation represents a difference between file descriptors provided by the publisher and the automatically generated content descriptors. For example, in FIG. 1, the first file descriptor 130 of the multimedia file 116 may include a description that indicates that the content is related to catalog pictures. The generated content descriptor 118 may indicate that the multimedia file 116 includes images of clothing. In this case, the first score may be a positive score, indicating that the information provided by the publisher was accurate.

The method includes receiving a request to transmit a second multimedia file, at 310. The second multimedia file is associated with a second file descriptor. The second file descriptor may be included in the second multimedia file or otherwise associated with the second multimedia file. For example, in FIG. 1, the server 102 receives the request 112 to transmit the second multimedia file (not shown) published by the first publisher 122. The method includes automatically generating a second generated content descriptor by analyzing the second multimedia file using a second set of analysis parameters, at 312. For example, in FIG. 1, the analysis engine 108 automatically generates a generated content descriptor 118 using one or more analysis parameters 120. In a particular embodiment, the first set of analysis parameters is the same as the second set of analysis parameters. Alternatively, the first set of analysis parameters may be different from the second set of analysis parameters. For example, the analysis parameters for a video file may be different from the analysis parameters for an audio file. The method includes comparing the second generated content descriptor to the second file descriptor, at 314.

The method includes determining a second score based on a second deviation of the second generated content descriptor from the second file descriptor, at 316. The second deviation represents a difference between file descriptors provided by the publisher and the automatically generated content descriptors. In the embodiment illustrated in FIG. 3, the method also includes determining a first reputation rating (e.g., of the first publisher 122 of FIG. 1) based on the first score and the second score, at 318. For example, the first score and the second score may be summed to determine a combined score. When the combined score is a positive score, a positive reputation rating is assigned. When the combined score is a negative score, a negative reputation rating is assigned. As another example, a positive score and a negative score may offset each other. Thus, in the case of a single positive score and a single negative score, a neutral reputation rating may be assigned. In the case of two positive scores and a single negative score, a positive reputation rating may be assigned. Similarly, in the case of two negative scores and one positive score, a negative reputation rating may be assigned.

Reputation ratings may provide an indication of reliability of file descriptors provided by a particular publisher. For example, referring to FIG. 1, the first publisher 122 may have a positive reputation rating. In this case, the first user 114 may determine that it is worthwhile to view the multimedia file 116 from the first publisher 122. As another example, the first publisher 122 may have a negative reputation rating. In this case, the first user 114 may determine that it is not worthwhile to view the multimedia file 116 from the first publisher 122. Further, reputation ratings may be used to filter content from publishers with negative reputation ratings. For example, in FIG. 1, the first profile 136 may indicate that the first user 114 is only interested in multimedia files from publishers with positive reputation ratings.

Figure 4:
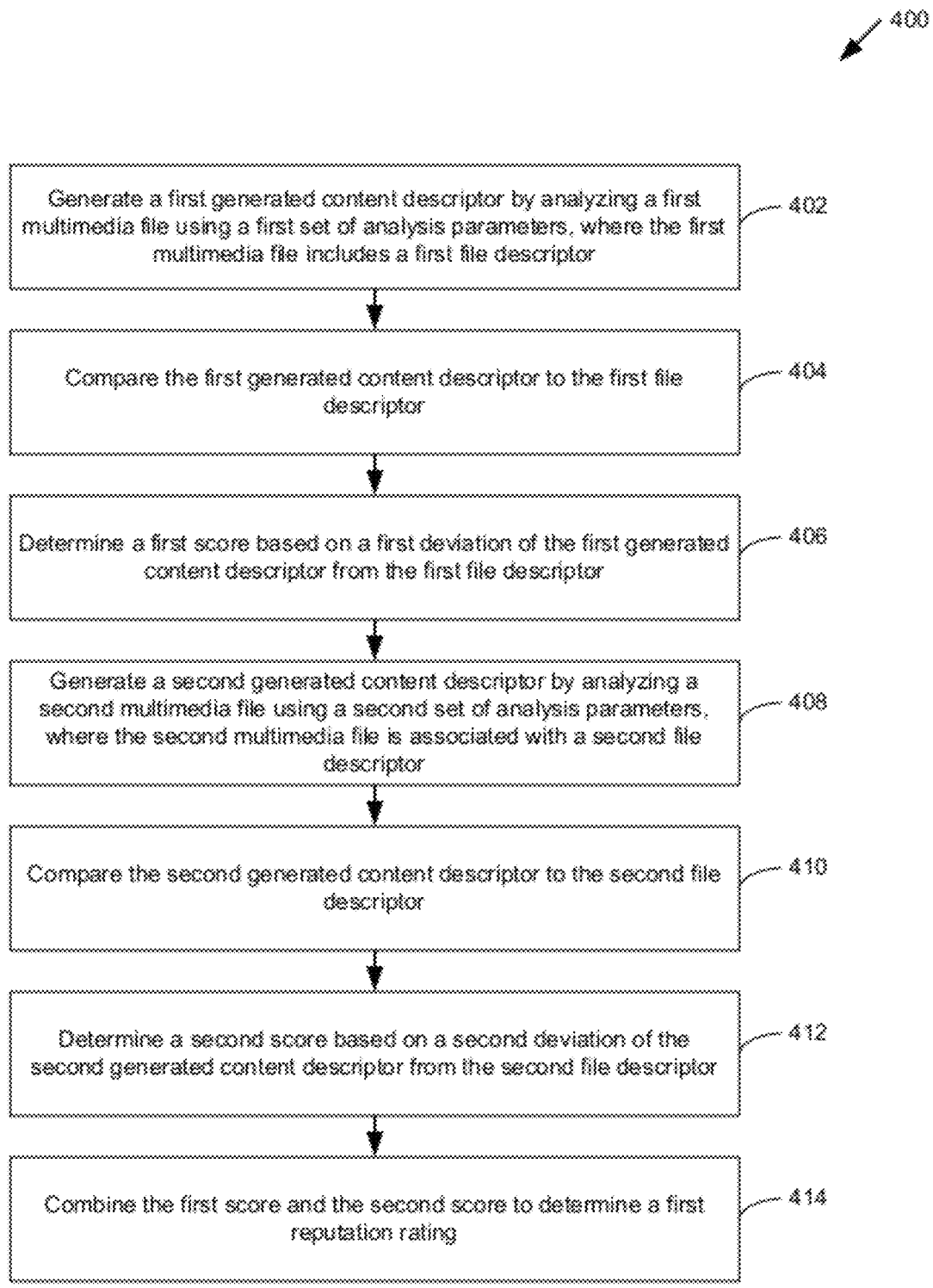
FIG. 4 is a flow chart of a third particular embodiment of a method of determining a score based on a comparison of a file descriptor to a generated content descriptor.

Referring to FIG. 4, a flow chart of a third particular embodiment of a method of determining a score based on a comparison of a file descriptor to a generated content descriptor is illustrated, at 400. In a particular embodiment, the method is implemented by a computer-readable medium including operational instructions, that when executed by a processor, cause the processor to perform the operations described.

The method includes generating a first generated content descriptor by analyzing a first multimedia file using a first set of analysis parameters, at 402. The first multimedia file is associated with a first file descriptor. The first file descriptor may be included in the first multimedia file or otherwise associated with the first multimedia file. For example, in FIG. 1, the analysis engine 108 analyzes the multimedia file 116 provided by the first publisher 122 and automatically generates a generated content descriptor 118 using one or more analysis parameters 120. The method includes comparing the first generated content descriptor to the first file descriptor, at 404. For example, in FIG. 1, the generated content descriptor 118 is compared to the first file descriptor 130. The method includes determining a first score based on a first deviation of the first generated content descriptor from the first file descriptor, at 406.

The method includes generating a second generated content descriptor by analyzing a second multimedia file using a second set of analysis parameters, at 408. The second multimedia file is associated with a second file descriptor. The second file descriptor may be included in the second multimedia file or otherwise associated with the second multimedia file. In a particular embodiment, the second multimedia file is published by the same publisher as the first multimedia file (e.g., the first publisher 122 of FIG. 1). As an illustration, in FIG. 1, the analysis engine 108 automatically generates a generated content descriptor 118 using one or more analysis parameters 120. In a particular embodiment, the first set of analysis parameters is the same as the second set of analysis parameters. Alternatively, the first set of analysis parameters may be different from the second set of analysis parameters. The method includes comparing the second generated content descriptor to the second file descriptor, at 410. The method includes determining a second score based on a second deviation of the second generated content descriptor from the second file descriptor, at 412.

The method includes combining the first score and the second score to determine a first reputation rating, at 414. The first reputation rating may be assigned to the publisher of the first multimedia file and the second multimedia file (e.g., the first publisher 122 of FIG. 1). When the combined score is a positive score, a positive reputation rating is assigned. When the combined score is a negative score, a negative reputation rating is assigned. As another example, a positive score and a negative score may offset each other. Thus, in the case of a single positive score and a single negative score, a neutral reputation rating may be assigned. In the case of two positive scores and a single negative score, a positive reputation rating may be assigned. Similarly, in the case of two negative scores and one positive score, a negative reputation rating may be assigned.

Figure 5:
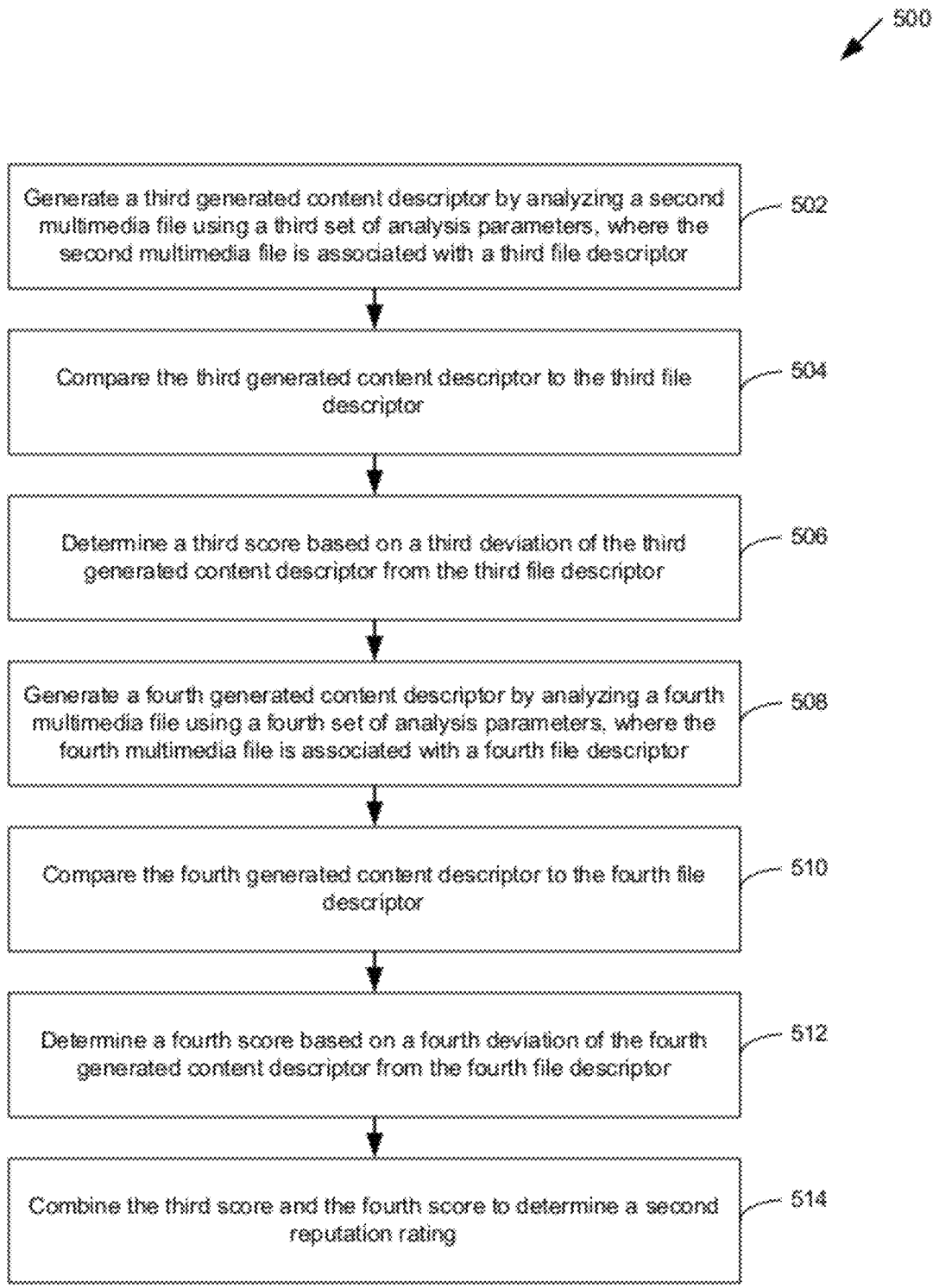
FIG. 5 is a flow chart of a fourth particular embodiment of a method of determining a score based on a comparison of a file descriptor to a generated content descriptor.

Referring to FIG. 5, a flow chart of a fourth particular embodiment of a method of determining a score based on a comparison of a file descriptor to a generated content descriptor is illustrated, at 500. In a particular embodiment, the method is implemented by a computer-readable medium including operational instructions, that when executed by a processor, cause the processor to perform the operations described.

The method includes generating a third generated content descriptor by analyzing a third multimedia file using a third set of analysis parameters, at 502. The third multimedia file is associated with a third file descriptor. The third file descriptor may be included in the third multimedia file or otherwise associated with the third multimedia file. In a particular embodiment, the third multimedia file is published by a second publisher (e.g., a publisher other than the first publisher 122 of FIG. 1). The method includes comparing the third generated content descriptor to the third file descriptor, at 504. The method includes determining a third score based on a third deviation of the third generated content descriptor from the third file descriptor, at 506.

The method includes generating a fourth generated content descriptor by analyzing a fourth multimedia file using a fourth set of analysis parameters, at 508. The fourth multimedia file is associated with a fourth file descriptor. The fourth file descriptor may be included in the fourth multimedia file or otherwise associated with the fourth multimedia file. In a particular embodiment, the fourth multimedia file is published by the second publisher (e.g., a publisher other than the first publisher 122 of FIG. 1). In a particular embodiment, the third set of analysis parameters is the same as the fourth set of analysis parameters. Alternatively, the third set of analysis parameters may be different from the fourth set of analysis parameters. The method includes comparing the fourth generated content descriptor to the fourth file descriptor, at 510. The method includes determining a fourth score based on a fourth deviation of the fourth generated content descriptor from the fourth file descriptor, at 512.

The method includes combining the third score and the fourth score to determine a second reputation rating, at 514. The second reputation rating may be assigned to the publisher of the third multimedia file and the fourth multimedia file (e.g., the second publisher). When the combined score is a positive score, a positive reputation rating is assigned. When the combined score is a negative score, a negative reputation rating is assigned. As another example, a positive score and a negative score may offset each other. Thus, in the case of a single positive score and a single negative score, a neutral reputation rating may be assigned. In the case of two positive scores and a single negative score, a positive reputation rating may be assigned. Similarly, in the case of two negative scores and one positive score, a negative reputation rating may be assigned.

Figure 6:
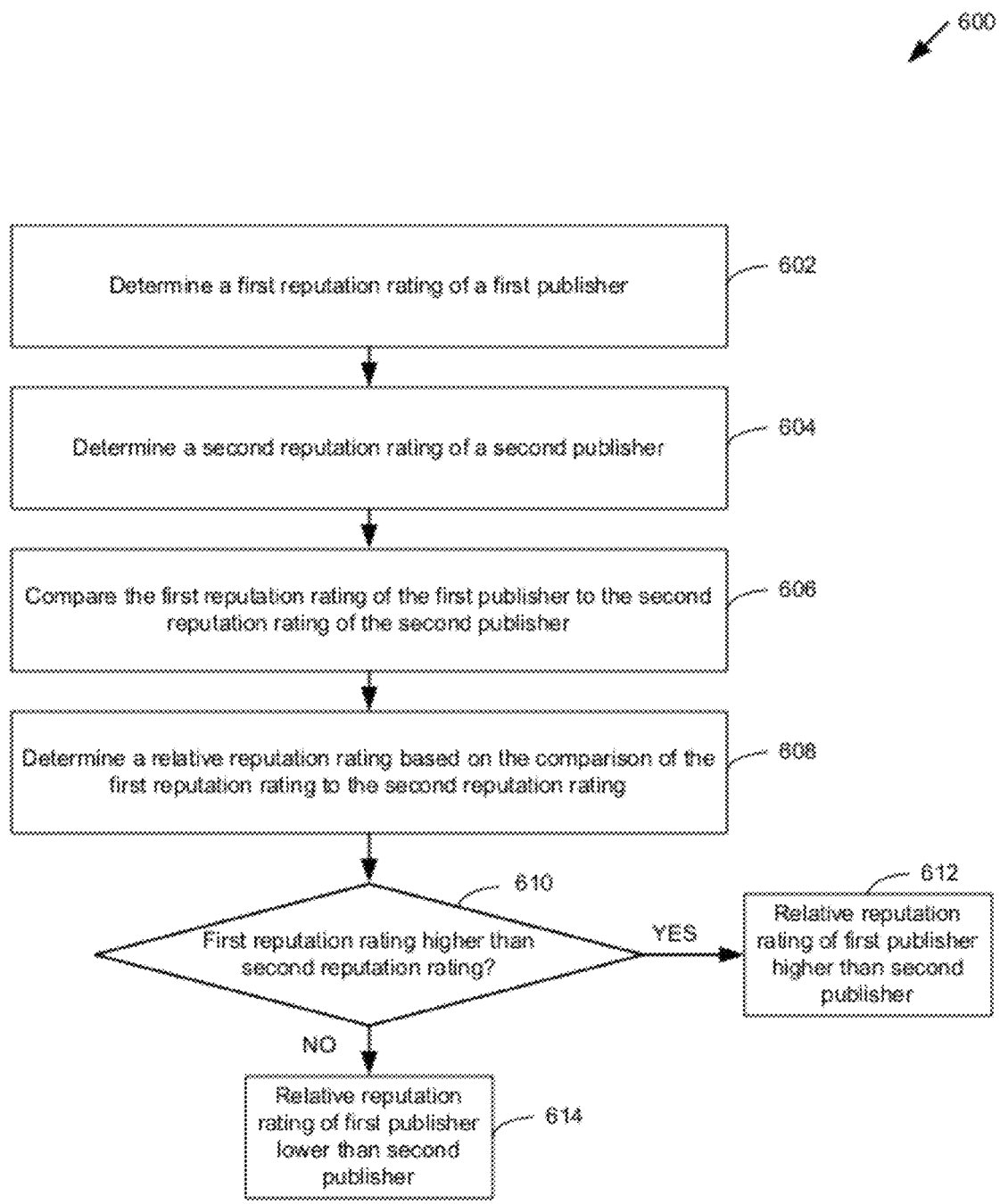
FIG. 6 is a flow chart of a particular embodiment of a method of determining a relative reputation rating of publishers.

The reputation ratings of multiple publishers may be compared. For example, referring to FIG. 6, a flow chart of a particular embodiment of a method of determining a relative reputation rating of publishers is illustrated, at 600. In a particular embodiment, the method is implemented by a computer-readable medium including operational instructions, that when executed by a processor, cause the processor to perform the operations described.

The method includes determining a first reputation rating of a first publisher, at 602. In a particular embodiment, the first reputation rating of the first publisher is determined using the method described in FIG. 4. The method includes determining a second reputation rating of a second publisher, at 604. In a particular embodiment, the second reputation rating of the second publisher is determined using the method described in FIG. 5.

The method includes comparing the first reputation rating of the first publisher to the second reputation rating of the second publisher, at 606. The method includes determining a relative reputation rating based on the comparison of the first reputation rating to the second reputation rating, at 608. In the embodiment illustrated in FIG. 6, the method includes determining whether the first reputation rating is higher than the second reputation rating, at 610. When the first reputation rating is higher than the second reputation rating, the relative reputation rating of the first publisher is higher than the second publisher, as shown at 612. When the first reputation rating is lower than the second reputation rating, the relative reputation rating of the first publisher is lower than the second publisher, as shown at 614.

A higher relative reputation rating may indicate that a particular publisher is more reliable than another publisher. Similarly, a lower reputation rating may indicate that the particular publisher is less reliable than another publisher. A user (e.g., the first user 114 of FIG. 1) may be able to determine whether to view a multimedia file (e.g., the multimedia file 116 of FIG. 1) from a particular publisher (e.g., the first publisher 122 of FIG. 1) based on a relative reputation rating.

Figure 7:
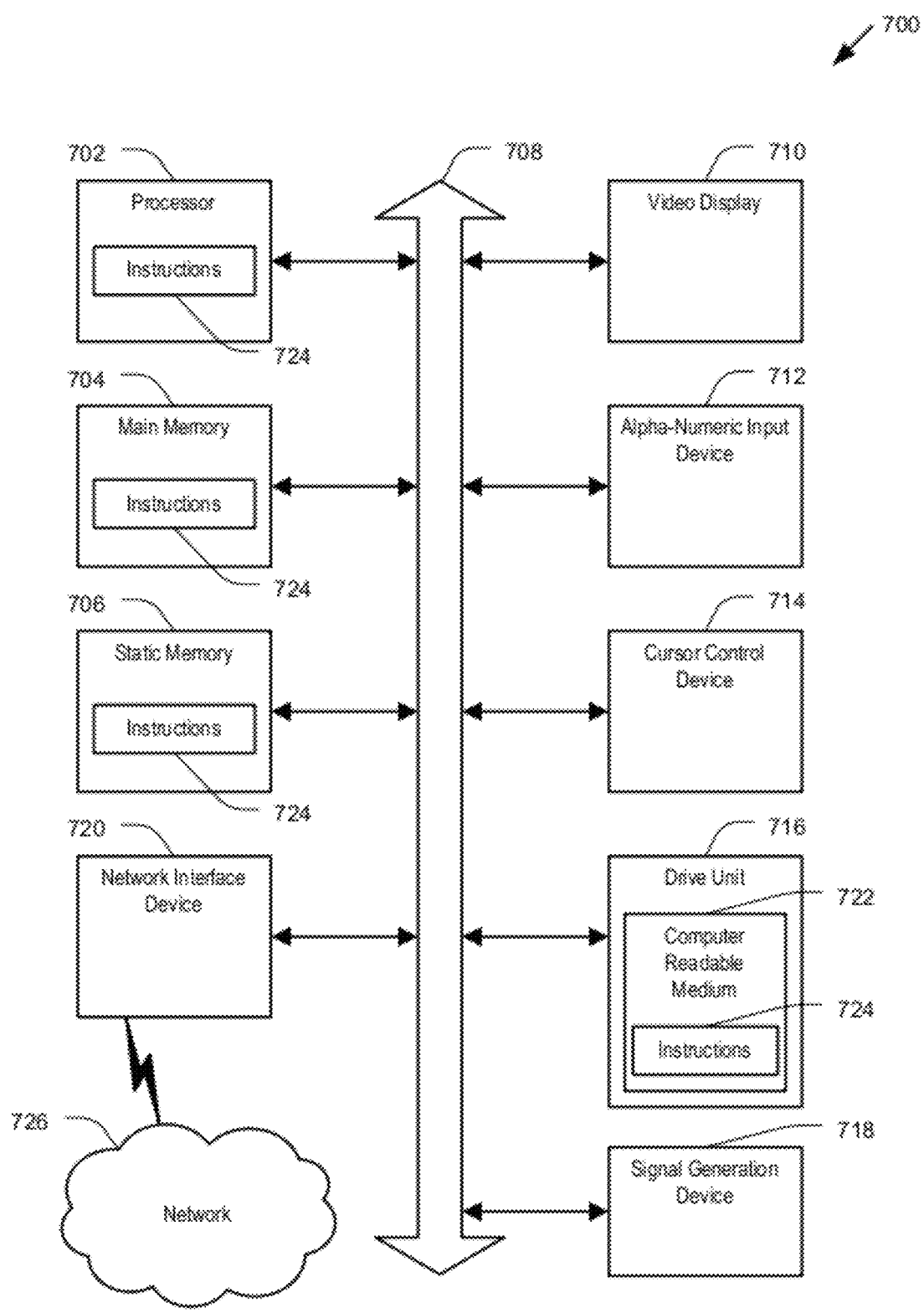
FIG. 7 depicts an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the general computer system 700 may include or be included within any one or more of the devices, servers, repositories, and network elements illustrated in FIG. 1.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 700 can be implemented using electronic devices that provide video, audio or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, a projection display, a high definition television (HDTV) display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting exemplary embodiment, the computer-readable medium can include a solid-state memory, such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered equivalent to a tangible storage medium. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for digital multimedia files (e.g., standards from the Moving Pictures Experts Group (MPEG), among others) and content rating standards (e.g., standards from the Motion Picture Association of America (MPAA) and television rating standards) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:

receiving, from a device of a user, a request to transmit a multimedia file;

automatically generating a content descriptor based on an analysis of the multimedia file using an analysis parameter, wherein the content descriptor includes a reputation rating of a publisher of the multimedia file, wherein the reputation rating is determined based on combining a set of scores associated with the publisher, and wherein each score of the set of scores is determined based on deviation of a particular content descriptor for a particular multimedia file from a file descriptor for the particular multimedia file;

determining whether the content descriptor satisfies filter criteria of a profile associated with the user, wherein the filter criteria includes a preferred reputation rating, wherein the content descriptor satisfies the filter criteria when the reputation rating of the content descriptor matches the preferred reputation rating, wherein the reputation rating is a positive rating when a combination of the set of scores produces a combined positive score, wherein the reputation rating is a negative reputation rating when a combination of the set of scores produces a combined negative score, wherein the preferred reputation rating is one of the positive rating and the negative rating, wherein each score is a positive score when the deviation is less than an allowable variance, and wherein each score is a negative score when the deviation exceeds the allowable variance;

rejecting the request to transmit the multimedia file in response to the content descriptor not satisfying the filter criteria of the profile; and transmitting the multimedia file along with the content descriptor in response to the content descriptor satisfying the filter criteria of the profile.

2. The method of claim 1, wherein the content descriptor comprises a content rating that includes one of a G rating, a PG rating, a PG-13 rating, an R rating, an NC-17 rating, a TV-Y rating, a TV-Y7 rating, a TV-Y7-FV rating, a TV-G rating, a TV-PG rating, a TV-14 rating, and a TV-MA rating.

3. The method of claim 1, wherein the profile is stored at a server.

4. The method of claim 3, wherein the request from the device is received over a television network.

5. The method of claim 1, wherein the analysis parameter includes a word or an image type.

6. The method of claim 1, wherein the filter criteria includes a list of allowed content descriptors, and wherein the content descriptor satisfies the filter criteria when the content descriptor is included in the list of allowed content descriptors.

7. The method of claim 1, wherein the profile associated with the user is included in the request.

8. A system comprising:
a network interface; and
a processor coupled to memory, wherein the memory comprises instructions, that, when executed by the processor, cause the processor to perform operations comprising:
receiving, via the network interface, a request from a device of a user to transmit a multimedia file;
automatically generating a content descriptor based on an analysis of the multimedia file using an analysis parameter, wherein the content descriptor includes a reputation rating of a publisher of the multimedia file, wherein the reputation rating is determined based on combining a set of scores associated with the publisher, and wherein each score of the set of scores is determined based on deviation of a particular content descriptor for a particular multimedia file from a file descriptor for the particular multimedia file;
determining whether the content descriptor satisfies filter criteria of a profile associated with the user, wherein the filter criteria includes a preferred reputation rating, wherein the content descriptor satisfies the filter criteria when the reputation rating of the content descriptor matches the preferred reputation rating, wherein the reputation rating is a positive rating when a combination of the set of scores produces a combined positive score, wherein the reputation rating is a negative reputation rating when a combination of the set of scores produces a combined negative score, wherein the preferred reputation rating is one of the positive rating and the negative rating, wherein each score is a positive score when the deviation is less than an allowable variance, and wherein each score is a negative score when the deviation exceeds the allowable variance;
rejecting the request to transmit the multimedia file in response to the content descriptor not satisfying the filter criteria of the profile; and
transmitting the multimedia file along with the content descriptor via the network interface in response to the content descriptor satisfying the filter criteria of the profile.

9. The system of claim 8, wherein the analysis parameter includes a word or an image type.

10. The system of claim 8, wherein the content descriptor comprises a content rating that includes one of a G rating, a PG rating, a PG-13 rating, an R rating, an NC-17 rating, a TV-Y rating, a TV-Y7 rating, a TV-Y7-FV rating, a TV-G rating, a TV-PG rating, a TV-14 rating, and a TV-MA rating.

11. The system of claim 8, wherein the filter criteria includes a list of allowed content descriptors, and wherein the content descriptor satisfies the filter criteria when the content descriptor is included in the list of allowed content descriptors.

12. The system of claim 8, wherein the profile is stored at a server.

13. The system of claim 8, wherein the request from the device is received over a television network.

14. The system of claim 8, wherein the deviation indicates a difference between the particular content descriptor for the s articular multimedia file and the file descriptor for the particular multimedia file.

15. The system of claim 8, wherein the operations further comprise extracting the file descriptor from the multimedia file.

16. The system of claim 8, wherein the content descriptor is automatically generated before the system receives the request to transmit the multimedia file, and wherein the content descriptor is stored in the memory.

17. A computer-readable storage device comprising instructions that, when executed by a processor, cause the processor to perform operations comprising:
receiving, from a device of a user, a request to transmit a multimedia file;
automatically generating a content descriptor based on an analysis of the multimedia file using an analysis parameter, wherein the content descriptor includes a reputation rating of a publisher of the multimedia file, wherein the reputation rating is determined based on combining a set of scores associated with the publisher, and wherein each score of the set of scores is determined based on deviation of a particular content descriptor for a particular multimedia file from a file descriptor for the particular multimedia file;
determining whether the content descriptor satisfies filter criteria of a profile associated with the user, wherein the profile is included within the request wherein the filter criteria includes a preferred reputation rating, wherein the content descriptor satisfies the filter criteria when the reputation rating of the content descriptor matches the preferred reputation rating, wherein the reputation rating is a positive rating when a combination of the set of scores produces a combined positive score, wherein the reputation rating is a negative reputation rating when a combination of the set of scores produces a combined negative score, wherein the preferred reputation rating is one of the positive rating and the negative rating, wherein each score is a positive score when the deviation is less than an allowable variance, and wherein each score is a negative score when the deviation exceeds the allowable variance;
rejecting the request to transmit the multimedia file in response to the content descriptor not satisfying the filter criteria of the profile; and transmitting the multimedia file along with the content descriptor in response to the content descriptor satisfying the filter criteria of the profile.

18. The computer-readable storage device of claim 17, wherein the deviation indicates a difference between the particular content descriptor for the particular multimedia file and the file descriptor for the particular multimedia file.

19. The computer-readable storage device of claim 17, wherein the filter criteria comprises a list of allowed content descriptors, and wherein the content descriptor satisfies the filter criteria when the content descriptor is included in the list of allowed content descriptors.

20. The computer-readable storage device of claim 17, wherein the analysis parameter includes a word or an image type.

* * * * *